Patented Mar. 19, 1940

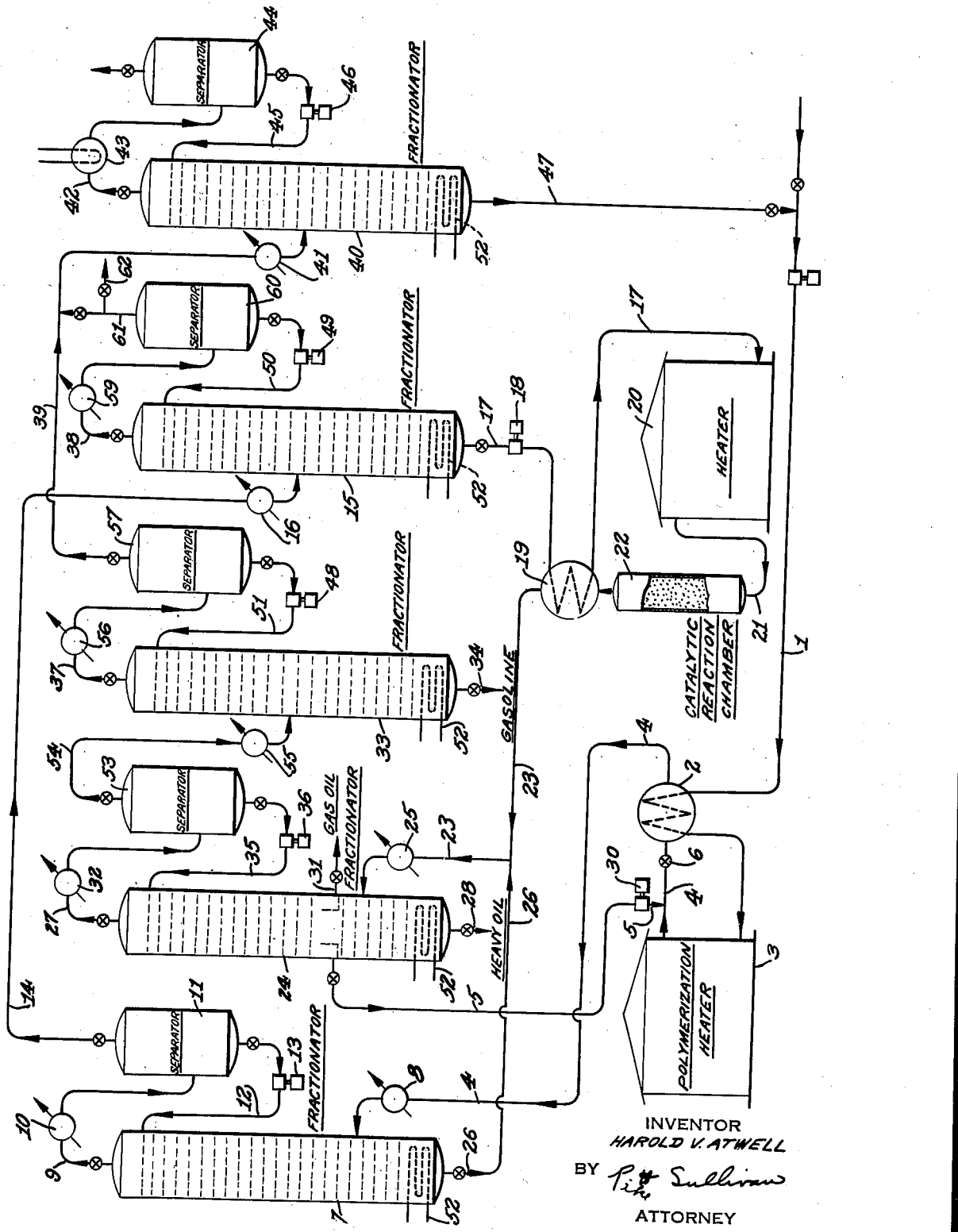

2,193,798

UNITED STATES PATENT OFFICE 2,193,798

CONVERSION OF HYDROCARBONS

Harold V. Atwell, White Plains, N. Y., assignor to Process Management Company, Inc., New York, N. Y., a corporation of Delaware Application December 17, 1936, Serial No. 116,332

2 Claims. (Cl. 196—9)

This invention relates to the production of normally liquid hydrocarbons from normally gaseous hydrocarbons and more particularly to a process of treating normally gaseous hydrocarbons to produce therefrom gasoline of high antiknock value.

The invention contemplates the thermal conversion or polymerization of a stream of normally gaseous hydrocarbons which may include both olefinic and paraffinic constituents and may be derived from any suitable source, such as natural gas or the products of oil or gas cracking. The conversion reaction products are treated to separate therefrom a fraction consisting of substantial proportions of the relatively light normally liquid hydrocarbons and normally gaseous hydrocarbons, leaving a second fraction consisting of normally liquid hydrocarbons in the gasoline boiling range but deficient in the light ends which ordinarily constitute a portion of gasoline. The first-mentioned fraction is subjected to conditions favoring selective polymerization, which may be catalytic, to preferentially convert by polymerization and similar reactions a portion of the branch-chain compounds contained therein to products of higher molecular weight in the gasoline boiling range. The selective conversion reaction products and the heavy fraction of the thermal conversion reaction products are treated to produce therefom a gasoline blend containing the gasoline constituents in both fractions and having the desired proportion of light ends and an increased proportion of heavier polymers including branch-chain polymers. This may be suitably accomplished by blending the said heavy fraction and the preferential conversion reaction products and fractionating the blend to produce the desired gasoline fraction therefrom. Any normally gaseous hydrocarbons having two or more carbon atoms per molecule and undersired for the selective conversion reaction may be separately recovered and returned to the system by adding them to the fresh feed to the thermal conversion step. Gas oil produced in the system may be separately recovered and used as a quench for the thermal polymerization reaction products. If desired, branch-chain olefinic polymers produced by the selective conversion reaction may be suitably hydrogenated.

The accompanying drawing is a diagrammatic plan of apparatus suitable for use in carrying out the present invention.

The invention will be specifically described with reference to the drawing but it is understood that the invention is not limited by the physical limitations of the apparatus illustrated and is capable of other modifications than the one chosen for purposes of illustration.

In the drawing fresh feed, which consists of normally gaseous hydrocarbons and may include both olefinic and paraffinic constituents, is introduced to the system through line 1, preheated in a heat exchanger 2, and introduced into a polymerization heater 3 wherein it is subjected to conditions of temperature and pressure to convert a substantial proportion thereof to normally liquid hydrocarbons. For example, the gases may be held under a pressure of 1000 to 2000 pounds and heated to a temperature of 1000° to 1100° F. in the polymerization heater. From the heater 3 the reaction products are withdrawn through line 4, cooled by the admixture therewith of cooling fluid through line 5, and further cooled by heat exchange with the fresh feed in heat exchanger 2 after having the pressure thereon released through valve 6. Through line 4 the reaction products are conducted to a fractionator 7 after being cooled further, if desired, by a cooler 8.

In the fractionator 7 conditions of temperature and pressure are maintained whereby a liquid fraction deficient in light ends ordinarily present in gasoline is condensed from the gases and collects in the bottom of the fractionator 7. The overhead from the fractionator 7 is withdrawn through line 9 and cooler 10 and consists of normally gaseous hydrocarbons and a substantial proportion of the lighter normally liquid hydrocarbons. For example, the reaction products may be fractionated whereby substantially all the $C_5$ hydrocarbons are passed overhead through line 9. The overhead gases are further cooled in the cooler 10 to condense a portion thereof including any undesirably heavy hydrocarbons, which portion is separated in the separator 11 and returned to the fractionator 7 as reflux through line 12 by means of pump 13. The uncondensed gases from the separator 11, which include a substantial proportion of the lighter normally liquid hydrocarbons, such as the $C_5$ hydrocarbons, are conducted through line 14 to a second fractionator 15 after further cooling in cooler 16. In the fractionator 15 conditions of temperature and pressure are maintained whereby substantially all the normally liquid hydrocarbons and the desired portion of the normally gaseous hydrocarbons contained therein are condensed and collect in the bottom of fractionator 15. Conditions of operation of the fractionator 15 may be controlled to provide for condensing all the $C_4$ hydrocarbons and selected portions of the $C_3$ and $C_2$ hydrocarbons, or the latter may be excluded from the condensate. The condensate from the bottom of the fractionator 15 which consists, for example, of $C_4$ and $C_5$ hydrocarbons, which include both straight- and branch-chain constituents, and any desired proportion of the $C_3$ and $C_2$ hydrocarbons is withdrawn through line 17 by a pump 18, preheated in a heat exchanger 19, and passed to a heater 20 which heats the gases to the temperature appropriate for the succeeding conversion step. From the heater 20 the gases are withdrawn through line 21 and passed to a catalytic reaction chamber 22 wherein at least a portion of the branch-chain hydrocarbons contained therein are preferentially converted to hydrocarbons of higher molecular weight by polymerization and possibly by means of other similar reactions with minimum conversion of the straight-chain hydrocarbons contained therein. In the catalytic reaction chamber 22 conditions of temperature and pressure are maintained and a suitable catalyst is provided whereby the desired preferential conversion of branch-chain hydrocarbons is accomplished, for example, by means of the preferential polymerization of iso-olefins. For example, with a catalyst such as aluminum oxide supported on diatomaceous earth, or aluminum chloride supported on pumice, the temperature may be from 50° to 150° C. at atmospheric pressure with a time of contact of 3 to 50 seconds depending upon the degree of polymerization desired. With the higher temperatures mentioned moderate pressures of 50 to 100 pounds per square inch are desirable.

The reaction products of the selective conversion reaction pass from the chamber 22 through line 23 in heat exchange with the incoming feed in a heat exchanger 19 and are introduced to a third fractionator 24 after having been further cooled, if desired, by means of a cooler 25.

The normally liquid fraction separated in the first-mentioned fractionator 7 is withdrawn through line 26 and admixed with the products of selective conversion passing through line 23 from the catalytic reaction chamber 22, and the combined streams are passed to the fractionator 24 through line 23. In the fractionator 24 conditions of temperature and pressure are maintained whereby a fraction including the gasoline constituents and lighter gases passes overhead through line 27 and whereby a heavier oil or tar is collected in the bottom of the fractionator 24 and withdrawn as desired through line 28. A side stream consisting substantially of clean gas oil is withdrawn from a trap-out tray in fractionator 24 through line 5, and passed by means of pump 30 for admixture with the hot products of thermal polymerization emerging from polymerization heater 3 in line 4 to quench the reaction products at least partially for preventing further polymerization or other conversion reaction. Gas oil not required for such use may be withdrawn from the trap-out tray and the system through line 31.

The overhead from the fractionator 24, withdrawn through line 27, is cooled by means of cooler 32 to condense a portion thereof including undesirably heavy constituents and introduced into a separator 53 wherein the resulting condensate is collected. The condensate in the separator 53 is returned to the fractionator 24 as reflux through line 35 by means of pump 36. Uncondensed gases pass overhead from the separator 53 through line 54 and a cooler 55 and are introduced to a fourth fractionator 33 wherein the gasoline fraction is condensed and stabilized and the undesired light gases are passed overhead. For example, the overhead gases may consist of $C_3$ and lighter hydrocarbons and hydrogen but may also include, if desired, all or a part of the $C_4$ hydrocarbons of the stream. The gasoline fraction is withdrawn from fractionator 33 and from the system through line 34.

The overhead gases from the fractionator 33 are withdrawn through line 37, passed through a cooler 56 to condense a portion thereof including undesirably heavy constituents and introduced to separator 57 wherein the resulting condensate is collected. This condensate may be returned to the fractionator 33 as reflux through line 51 by means of pump 48. Uncondensed gases pass overhead from the separator 57 through line 39 to a fractionator 40 after being further cooled by means of a cooler 41.

The overhead gases from the fractionator 15 are withdrawn through line 38, passed through a cooler 59 to condense a portion thereof including desired heavy constituents and introduced to a separator 60 wherein the resulting condensate is collected. This condensate may be returned to the fractionator 15 as reflux through line 50 by means of pump 49. Uncondensed gases pass overhead from the separator 60 through line 61 and are combined with the gases passing to the fractionator 40 through line 39. If the gases from the separator 60 contain few constituents desired for recycling to the polymerization heater they may be withdrawn from the system through line 62.

In the fractionator 40 conditions of temperature and pressure are maintained whereby hydrogen and methane and any undesired $C_2$ hydrocarbons are separated from the heavier hydrocarbons. The overhead gases consisting principally of hydrogen and methane and undesired $C_2$ hydrocarbons are withdrawn through line 42 and are further cooled by means of refrigeration means 43 to condense a portion thereof including any desired constituents which are separated in separator 44 and returned as reflux to fractionator 40 through line 45 by means of pump 46. The $C_2$ and heavier hydrocarbons desired for the system collect in the bottom of fractionator 40 and are withdrawn through line 47 and combined with the fresh feed passing through line 1.

Heating means, such as heating coils 52, may be provided in the bottoms of the fractionators 7, 24, 33, 15 and 40 to maintain the proper temperature of the condensate to prevent the inclusion therein of undesired light components.

The various fractionators are provided with suitable trays or other fractionating equipment whereby the various operations incidental to fractionation such as evaporation, absorption, condensation, stripping, etc. occur. Suitable cooling means other than the reflux means shown may be provided in the tops of the various fractionators as desired to effect any further cooling necessary.

It is apparent that while separate fractionators 24 and 33 have been provided for the separation of gasoline and gas oil and heavier oils from the system this separation may be suitably accomplished in one fractionator of suitable dimensions and provided with an intermediate trapout tray and means for withdrawing liquid collected therein from the fractionator located at a point suitable to effect collection and withdrawal of gasoline. This general observation holds true for the other fractionating operations of the system, a plurality of fractionators having been shown in order to simplify presentation of the subject matter of the invention. For example, fractionators 7 and 15 could be combined in a single structure with an intermediate trapout tray arranged to effect collection and withdrawal of a liquid consisting of light normally liquid hydrocarbons and normally gaseous hydrocarbons for passage to heater 20, as described.

Although the specific embodiment of the invention described above includes the combination of the whole liquid fraction from fractionator 7 with the entire product of selective conversion, it is obvious that the gasoline fraction from each may be separately recovered, after which the recovered fractions are blended in the desired proportions. Furthermore, where the products are jointly fractionated, as described above, a portion of the reaction products of selective conversion and/or a portion of the liquid fraction from fractionator 7 may be separately withdrawn and separately treated in order to preserve the desired blend in the gasoline produced in fractionator 33.

The gasoline produced according to this invention is of superior value in that it does not have an excess of light ends since a portion of these have been selectively converted to liquids of higher boiling point with the result that the gasoline produced in the system has a better balance of high and low boiling point constituents. Furthermore, the selective conversion of branch-chain hydrocarbons, such as iso-olefins, produces branch-chain higher boiling polymers in the gasoline which improve its anti-knock value.

The above description relates to a specific embodiment of the invention, but it is to be understood that the invention is capable of other modifications and embodiments wherein the light ends of polymerized gasoline together with heavier gases are subjected to polymerizing conditions to preferentially convert branch-chain hydrocarbons such as iso-olefins to products of higher molecular weight to produce a better balance of low and high boiling constituents in the gasoline and increase the anti-knock value of the gasoline by the inclusion therein of high boiling branch-chain polymers.

I claim:

1. In the process of converting normally gaseous hydrocarbons to gasoline motor fuel by heating normally gaseous hydrocarbons under high pressure to effect substantial conversion thereof to liquid hydrocarbons including a gasoline fraction having a proportion of relatively light low-boiling normally liquid hydrocarbons including olefinic constituents which ordinarily constitute the light ends of gasoline which is in excess of the proportion of such low-boiling constituents desired in a gasoline of satisfactory boiling characteristics, the steps of separating from the products of said conversion operation normally liquid hydrocarbons substantially deficient in said light low-boiling normally liquid hydrocarbons and a fraction consisting of substantial proportions of said light low-boiling normally liquid hydrocarbons and normally gaseous hydrocarbons having four carbon atoms per molecule and substantially free of hydrocarbons having less than four carbon atoms per molecule, subjecting said last-mentioned fraction to polymerizing conditions in the presence of a polymerizing catalyst to convert olefinic constituents thereof to higher boiling hydrocarbons, and blending gasoline constituents of the reaction products of said catalytic polymerization treatment with said normally liquid hydrocarbons deficient in said light low-boiling normally liquid hydrocarbons to produce a gasoline motor fuel of desired boiling characteristics.

2. In the process of converting normally gaseous hydrocarbons to gasoline motor fuel by heating normally gaseous hydrocarbons under high pressure to effect substantial conversion thereof to liquid hydrocarbons including a gasoline fraction having a proportion of relatively light low-boiling normally liquid hydrocarbons including iso-olefin constituents which ordinarily constitute the light ends of gasoline which is in excess of the proportion of such low-boiling constituents desired in a gasoline of satisfactory boiling characteristics, the steps of separating from the products of said conversion operation normally liquid hydrocarbons substantially deficient in said light low-boiling normally liquid hydrocarbons and a fraction consisting of substantial proportions of said light low-boiling normally liquid hydrocarbons and normally gaseous hydrocarbons having four carbon atoms per molecule and substantially free of hydrocarbons having less than four carbon atoms per molecule, subjecting said fraction to selective polymerization conditions to convert at least a portion of the iso-olefins contained therein to higher boiling hydrocarbons with limited conversion of normal olefins, and blending constituents of the reaction products of said selective conversion treatment with said normally liquid hydrocarbons deficient in said light low-boiling normally liquid hydrocarbons to produce a gasoline motor fuel of desired boiling characteristics.

HAROLD V. ATWELL.